US012748830B2

(12) United States Patent
Adcock et al.

(10) Patent No.: US 12,748,830 B2
(45) Date of Patent: Sep. 29, 2026

(54) HAND-BASED BIOMETRIC AUTHENTICATION

(71) Applicant: Capital One Services, LLC, McLean, VA (US)

(72) Inventors: Lee Adcock, Midlothian, VA (US); Michael D. Powell, Hagerstown, MD (US); Stephen Mccrowey, Columbia, MD (US); Stanley Thercellya, Rosedale, NY (US)

(73) Assignee: Capital One Services, LLC, McLean, VA (US)

( * ) Notice: Subject to any disclaimer, the term of this patent is extended or adjusted under 35 U.S.C. 154(b) by 120 days.

(21) Appl. No.: 18/645,821

(22) Filed: Apr. 25, 2024

(65) Prior Publication Data

US 2025/0335562 A1 Oct. 30, 2025

(51) Int. Cl.
*G06F 21/32* (2013.01)
*G06F 21/34* (2013.01)

(52) U.S. Cl.
CPC .............. *G06F 21/32* (2013.01); *G06F 21/34* (2013.01)

(58) Field of Classification Search
CPC ................................ G06F 21/32; G06F 21/34
See application file for complete search history.

(56) References Cited

U.S. PATENT DOCUMENTS

| | | | | |
|---|---|---|---|---|
| 6,325,285 B1* | 12/2001 | Baratelli | G06K 7/0021 | 235/382 |
| 10,332,102 B2 | 6/2019 | Zarakas et al. | | |
| 10,482,453 B2 | 11/2019 | Zarakas et al. | | |
| 2008/0240514 A1* | 10/2008 | Zhang | G06V 40/12 | 382/115 |
| 2012/0105081 A1* | 5/2012 | Shaikh | G06F 3/0445 | 29/829 |
| 2015/0081552 A1* | 3/2015 | Stewart | G06Q 20/3226 | 705/44 |
| 2019/0199714 A1* | 6/2019 | Kamal | H04L 63/0861 | |
| 2021/0229633 A1 | 7/2021 | Delong et al. | | |
| 2022/0245984 A1* | 8/2022 | Wang | G06K 19/0718 | |

* cited by examiner

*Primary Examiner* — Lesa M Kennedy
(74) *Attorney, Agent, or Firm* — Harrity & Harrity, LLP

(57) ABSTRACT

In some implementations, a physical card may capture sensor data indicating a touch profile along an outer edge of the physical card, where the touch profile is indicative of a finger placement of a hand holding the physical card. The physical card may compare the touch profile to one or more valid touch profiles. The physical card may determine that the touch profile sufficiently matches a valid touch profile, of the one or more valid touch profiles, based on comparing the touch profile to the one or more valid touch profiles. The physical card may transmit an indication that the physical card is enabled, based on determining that the touch profile sufficiently matches the valid touch profile.

20 Claims, 9 Drawing Sheets

HAND-BASED BIOMETRIC AUTHENTICATION

BACKGROUND

Biometric authentication is an identification and/or security process that uses a biologically unique identifier (e.g., fingerprint, voice, iris, retina, or face) of an authorized user (e.g., an account owner, a device owner, or the like) to authenticate a user trying to gain access to physical and/or digital resources (e.g., an account or a device). The process includes capturing a biologically unique identifier of the user trying to gain access and comparing the captured identifier to a stored copy of the biologically unique identifier of the authorized user. If there is a sufficient match, then the user is granted access to the physical and/or digital resources.

SUMMARY

Some implementations described herein relate to a system for biometric authentication. The system may include a processing system that includes one or more memories and one or more processors communicatively coupled to the one or more memories. The one or more processors may be configured to receive anatomical data relating to a hand of an authorized user. The one or more processors may be configured to process the anatomical data to identify one or more valid touch profiles that are in accordance with the anatomical data. The system may include a physical card including a card body and a plurality of sensors around an outer edge of the card body. The physical card may be configured to receive information indicating the one or more valid touch profiles. The physical card may be configured to capture, from the plurality of sensors, sensor data indicating a touch profile along the outer edge. The physical card may be configured to compare the touch profile to the one or more valid touch profiles. The physical card may be enabled or disabled in accordance with whether the touch profile sufficiently matches a valid touch profile of the one or more valid touch profiles.

Some implementations described herein relate to a physical card. The physical card may include a card body, a plurality of sensors around an outer edge of the card body, one or more memories, in the card body, that store a touch validation model, and one or more processors in the card body and communicatively coupled to the plurality of sensors and the one or more memories. The one or more processors may be configured to capture, from the plurality of sensors, sensor data indicating a touch profile detected along the outer edge. The one or more processors may be configured to input the touch profile to the touch validation model. The one or more processors may be configured to transmit an indication of whether the physical card is enabled, in accordance with an output of the touch validation model.

Some implementations described herein relate to a method of biometric authentication. The method may include capturing, by a physical card using a plurality of sensors positioned around an outer edge of the physical card, sensor data indicating a touch profile along the outer edge, where the touch profile is indicative of a finger placement of a hand holding the physical card. The method may include comparing, by the physical card, the touch profile to one or more valid touch profiles. The method may include determining, by the physical card, that the touch profile sufficiently matches a valid touch profile, of the one or more valid touch profiles, based on comparing the touch profile to the one or more valid touch profiles. The method may include transmitting, by the physical card to a terminal or a user device, an indication that the physical card is enabled, based on determining that the touch profile sufficiently matches the valid touch profile.

DETAILED DESCRIPTION

Figure 1A:
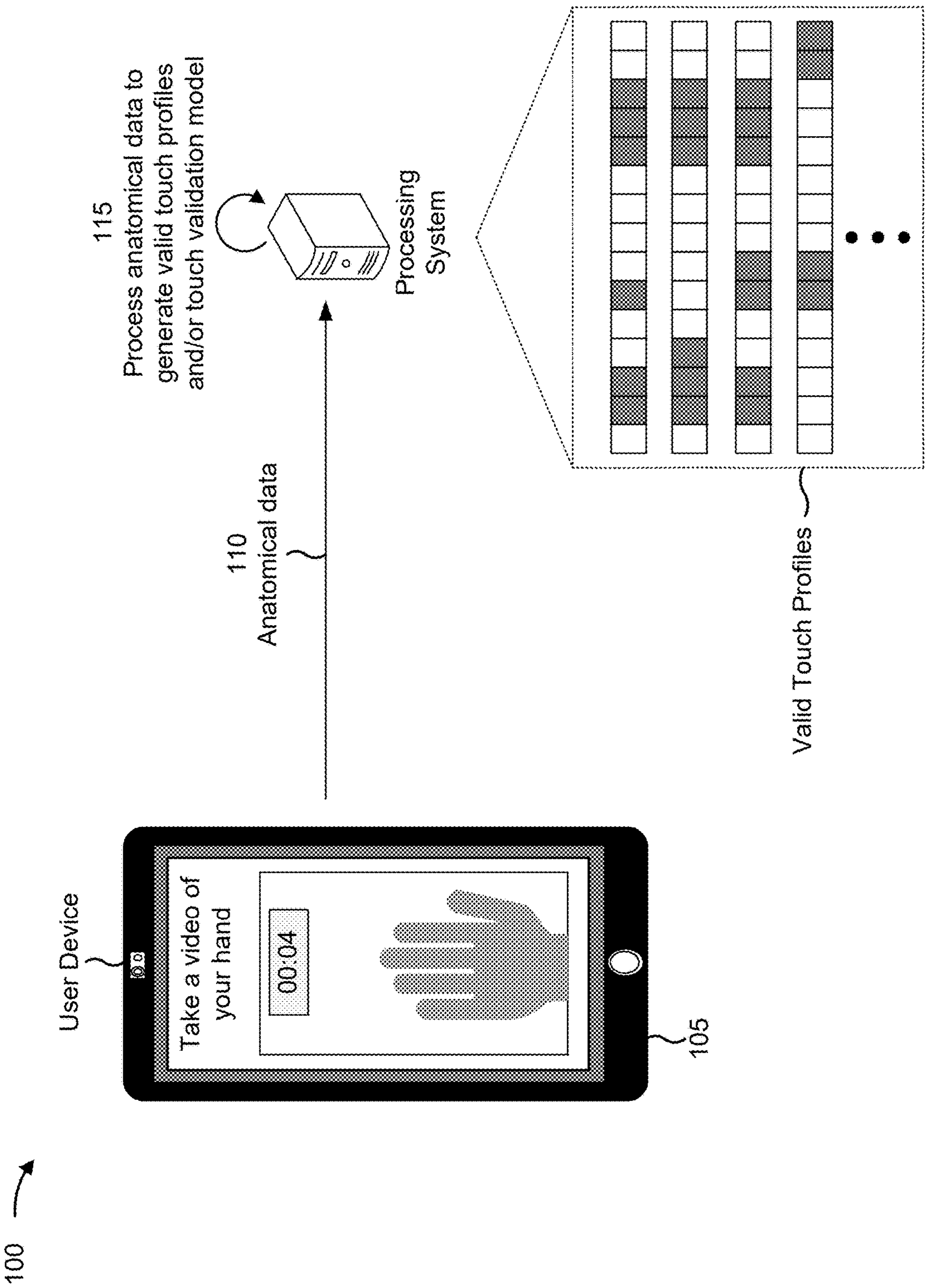
FIGS. 1A-1F are diagrams of an example associated with hand-based biometric authentication, in accordance with some embodiments of the present disclosure.

The following detailed description of example implementations refers to the accompanying drawings. The same reference numbers in different drawings may identify the same or similar elements.

Modern transaction cards (e.g., automated teller machine (ATM) cards, debit cards, credit cards, or gift cards) contain embedded integrated circuits to store authentication data that is used at the time of a transaction. For some transaction cards, the authentication data may be a fingerprint of a cardholder stored on the transaction cards, which may provide more security than, for example, a personal identification number (PIN). The transaction cards may employ fingerprint scanners that require a user to provide a fingerprint at the time of the transaction. In one example of such a transaction card, a digital template of the cardholder's fingerprint is stored in memory of the transaction card. When a user presents the transaction card at a transaction terminal, the transaction card, via the fingerprint scanner embedded on the transaction card, scans the user's fingerprint and matches it to the digital template of the cardholder's fingerprint stored in the memory of the transaction card. If there is a successful match, the transaction is authenticated.

However, such transaction cards that utilize fingerprint authentication, or similar biometric authentication, still may be exploited (e.g., by lifting a fingerprint pattern from a fingerprint reader that has not been wiped clean). Furthermore, fingerprint scanners are large, relative to an overall form factor of transaction cards, and occupy an excessive amount of space. Moreover, given the small footprint of transaction cards, the amount of processing power available for biometric authentication is limited. Accordingly, transaction cards generally lack the ability to perform more complex or robust biometric authentication.

Some implementations described herein relate to user authentication using hand characteristics, such as hand size, finger size, and/or finger length, as a biometric indicator. In some implementations, a physical card (e.g., a transaction card) may include a plurality of sensors (e.g., touch sensors) arranged around an outer edge of the physical card. Arranging the sensors around the outer edge of the physical card enables a dense sensor array capable of precise measurements, without occupying space on a surface of the physical card. The sensors are configured to detect a touch profile (e.g., touch measurements taken by sensors, sensor values, or the like), indicating a finger placement on the physical card, when an individual holds the physical card. The physical card (e.g., using an embedded processor) may compare the touch profile to a set of valid touch profiles and/or may input the touch profile to a touch validation model, associated with a hand of an authorized user of the physical card, to determine whether the touch profile is valid (e.g., whether there is a sufficient match between the touch profile and a valid touch profile), where the touch profile being valid indicates that the individual in possession of the physical card is an authorized user. Hand characteristics provide a biometric indicator that is highly secure and difficult to exploit.

In some implementations, the set of valid touch profiles and/or the touch validation model may be generated by a backend processing system based on anatomical data relating to a hand of an authorized user of the physical card. The anatomical data may include an image of the hand, a video of the hand, and/or touchscreen input data associated with the hand, among other examples. As an example, the processing system may use the anatomical data to identify characteristics of the hand, and may generate the valid touch profiles and/or the touch validation model in accordance with the characteristics of the hand. The valid touch profiles generated by the processing system indicate valid finger placements on the physical card that could conceivably be produced by the hand (e.g., according to hand size, finger size, and/or finger length). Similarly, the touch validation model generated by the processing system can indicate whether an inputted touch profile is valid.

The set of valid touch profiles and/or the touch validation model generated by the processing system may be written to and stored on the physical card (e.g., via a user device or a transaction terminal). Thus, the processing to identify whether a touch profile is valid is offloaded to the processing system, and the physical card merely needs to store a relatively small amount of information. This enables the physical card to perform complex and robust biometric authentication using its on-board, limited processing capabilities and without the need to increase a form factor of the physical card to accommodate additional processing capability.

FIGS. 1A-1F are diagrams of an example 100 associated with hand-based biometric authentication. As shown in FIGS. 1A-1F, example 100 includes a physical card, a processing system, one or more user devices, and one or more transaction terminals. These devices are described in more detail in connection with FIGS. 2 and 3. As described further in connection with FIG. 2, the physical card may have a processor, a memory, and an embedded microchip via which the physical card may receive and/or transmit data. Furthermore, a plurality of sensors may be arranged around an outer edge of the physical card. The sensors may include touch sensors (e.g., capacitive touch sensors and/or resistive touch sensors), temperature sensors, photosensors, or another type of sensor that can detect a finger placement of an individual holding the physical card.

As shown in FIG. 1A, a user (e.g., an authorized user of an account associated with the physical card, or an account holder) may use the user device to set up and/or activate hand-based biometric authentication for the physical card (e.g., ATM card, debit card, credit card, or gift card). The user device may include an anatomy capturing device, such as a camera, a touchscreen, and/or an optical scanner, among other examples. For example, the user device may be a mobile phone, as shown in FIG. 1A, a computer, an ATM, a hand scanning machine (e.g., at a bank branch location), or the like. A phone or computer may allow for the user to set up and/or activate hand-based biometric authentication at the user's convenience (e.g., time and location). Alternatively, an ATM and/or hand scanning machine at a bank branch location may be convenient for the user to set up and/or activate hand-based biometric authentication at the same time as setting up an account and/or under the supervision and security of the bank.

As shown by reference number 105, the user device may capture anatomical data relating to a hand of the user (e.g., an authorized user of the physical card) using the anatomy capturing device. For example, the anatomical data may include one or more images of the hand, one or more videos of the hand, and/or touchscreen input data associated with the hand. In some implementations, the user device may instruct (e.g., present instructions in text on a display of the user device or via voice through a speaker of the user device) the user to capture the images, to capture the videos, and/or to provide touchscreen inputs. For example, with respect to the touchscreen inputs, the user device may instruct the user to touch the touchscreen using a first hand position, then to touch the touchscreen using a second hand position, and so forth. In some implementations, the user device may convert the captured anatomical data into a digital representation of the user's hand (e.g., a point cloud, a mesh, a set of measurements, or the like). As shown by reference number 110, the user device may transmit, and the processing system may receive, the anatomical data (e.g., the original anatomical data or the converted anatomical data). The processing system may be a backend system associated with an issuer of the physical card.

As shown by reference number 115, the processing system may process the anatomical data to generate one or more valid touch profiles that are in accordance with the anatomical data. Additionally, or alternatively, the processing system may process the anatomical data to generate a touch validation model. In some implementations, to process the anatomical data, the processing system may convert the captured anatomical data into a digital representation of the user's hand (if such conversion was not performed by the user device). As an example, the processing system may use the anatomical data to identify characteristics of the hand, such as hand size (e.g., overall hand width, overall hand length, palm width, palm length, and/or distances between fingers, among other examples), finger size (e.g., finger width and/or fingertip width, among other examples), and/or finger length, and the processing system may generate the valid touch profiles and/or the touch validation model in accordance with the characteristics of the hand.

In some implementations, the processing system may process the anatomical data (e.g., the original anatomical data or the converted anatomical data) using a machine learning model. The machine learning model may be trained to output the one or more valid touch profiles and/or the touch validation model from an input of the anatomical data and using a feature set that includes hand size (e.g., overall hand width, overall hand length, palm width, palm length, and/or distances between fingers, among other examples), finger size (e.g., finger width and/or fingertip width, among other examples), and finger length, among other examples.

A valid touch profile generated by the processing system may indicate a valid finger placement on the physical card that could conceivably be produced by the hand (e.g., according to hand size, finger size, and/or finger length).

Unlike a fingerprint or a similar biometric indicator that is relatively constant over time, an individual may use a different finger placement each time the individual holds the physical card. Accordingly, the valid touch profiles generated by the processing system may include multiple touch profiles each representing a different possible finger placement of the hand, thereby addressing inconsistent finger placement on the physical card and enabling biometric authentication with improved accuracy. A touch profile may indicate a respective output state (e.g., a logic "1" voltage or a logic "0" voltage, or a particular output voltage) for each of the sensors around the outer edge of the physical card, which corresponds to finger placement on the outer edge of the physical card. The valid touch profiles generated for an authorized user can be used for the physical card, other physical cards associated with the authorized user, and/or transferred across physical cards associated with the authorized user.

Similarly, the touch validation model generated by the processing system is configured to receive an input of a touch profile, and to output an indication of whether the inputted touch profile is valid (or output a probability of whether the inputted touch profile is valid). For example, the touch validation model may output whether the inputted touch profile is a valid touch profile for the authorized user. The touch validation model may be based on a formula, an algorithm, a machine learning model, or the like. The touch validation model may be particular to the authorized user by using the anatomical data for the authorized user (e.g., different authorized users can have different touch validation models). For example, a formula-based touch validation model may use coefficients for parameters of a formula that are particular to the authorized user (e.g., based on the anatomical data of the authorized user).

Figure 1B:
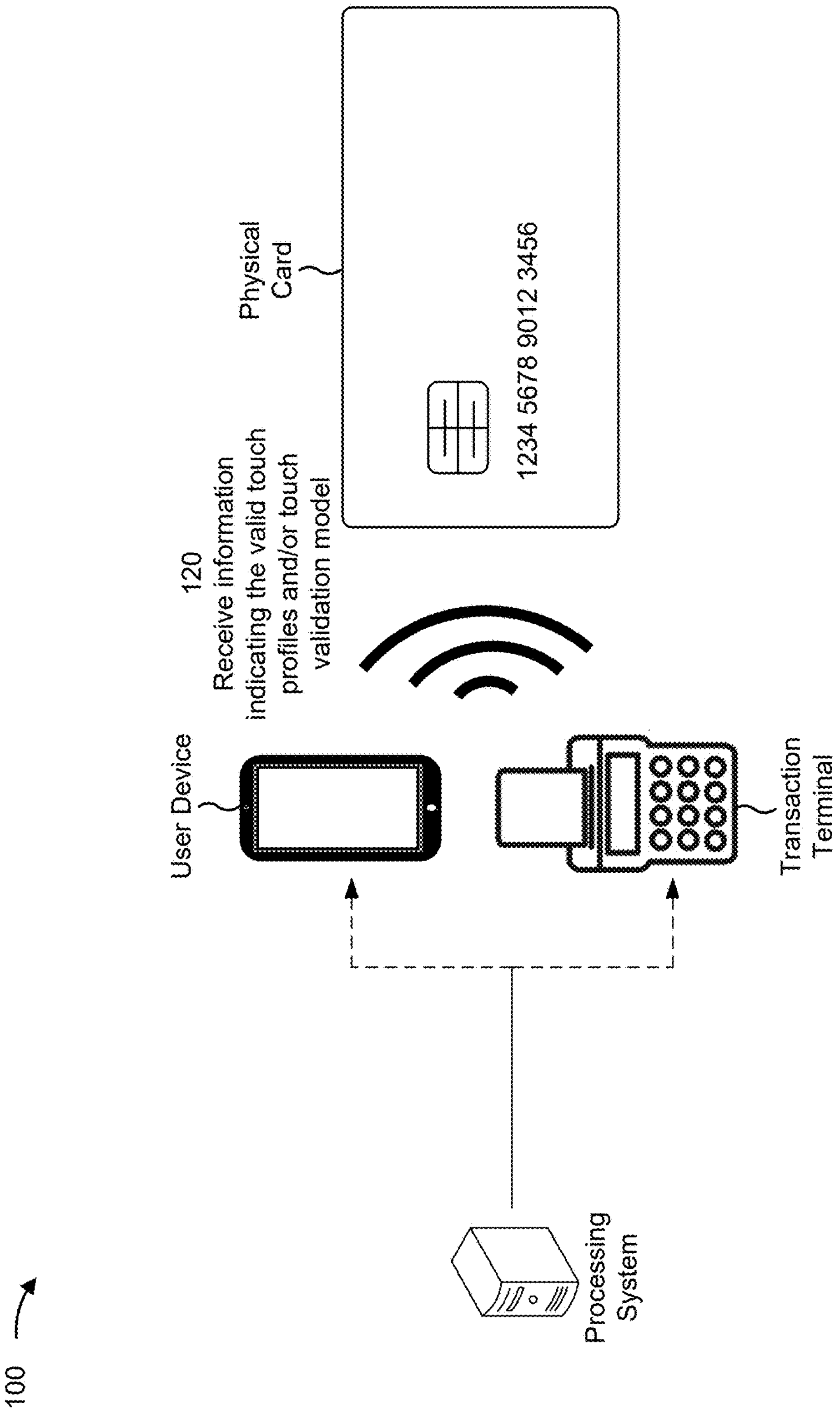

As shown in FIG. 1B, and by reference number 120, the physical card may receive information indicating the valid touch profiles and/or the touch validation model. In some implementations, the processing system may transmit, and the user device may receive, the information indicating the valid touch profiles and/or the touch validation model. Accordingly, the physical card may receive the information indicating the valid touch profiles and/or the touch validation model from the user device (e.g., via near-field communication (NFC) or the like). For example, the user device may instruct the user to place the physical card in close proximity to the user device (e.g., to perform a "tap" with the physical card), and the user device may write the information indicating the valid touch profiles and/or the touch validation model to a memory of the physical card while the physical card is in close proximity to the user device.

In some implementations, the processing system may transmit the information indicating the valid touch profiles and/or the touch validation model, along with information indicating an account identifier associated with the physical card, to a transaction terminal (e.g., an ATM) or to a backend device that serves a transaction terminal network. The transaction terminal, or the backend device, may store the valid touch profiles and/or the touch validation model in association with the account identifier for subsequent loading to the physical card. For example, when the physical card is used at the transaction terminal (e.g., inserted into the transaction terminal), the transaction terminal may detect that the physical card is associated with the account identifier and may load the valid touch profiles and/or the touch validation model into a memory of the physical card. In other words, the physical card may receive the information indicating the valid touch profiles and/or the touch validation model from the transaction terminal.

The physical card may store the valid touch profiles and/or the touch validation model in a memory for use in subsequent user authentication. Thus, the processing to identify whether a touch profile is valid is offloaded to the processing system, and the physical card merely needs to store a relatively small amount of information. This enables the physical card to perform complex and robust biometric authentication using its on-board, limited processing capabilities and without the need to increase a form factor of the physical card to accommodate additional processing capability.

Figure 1C:
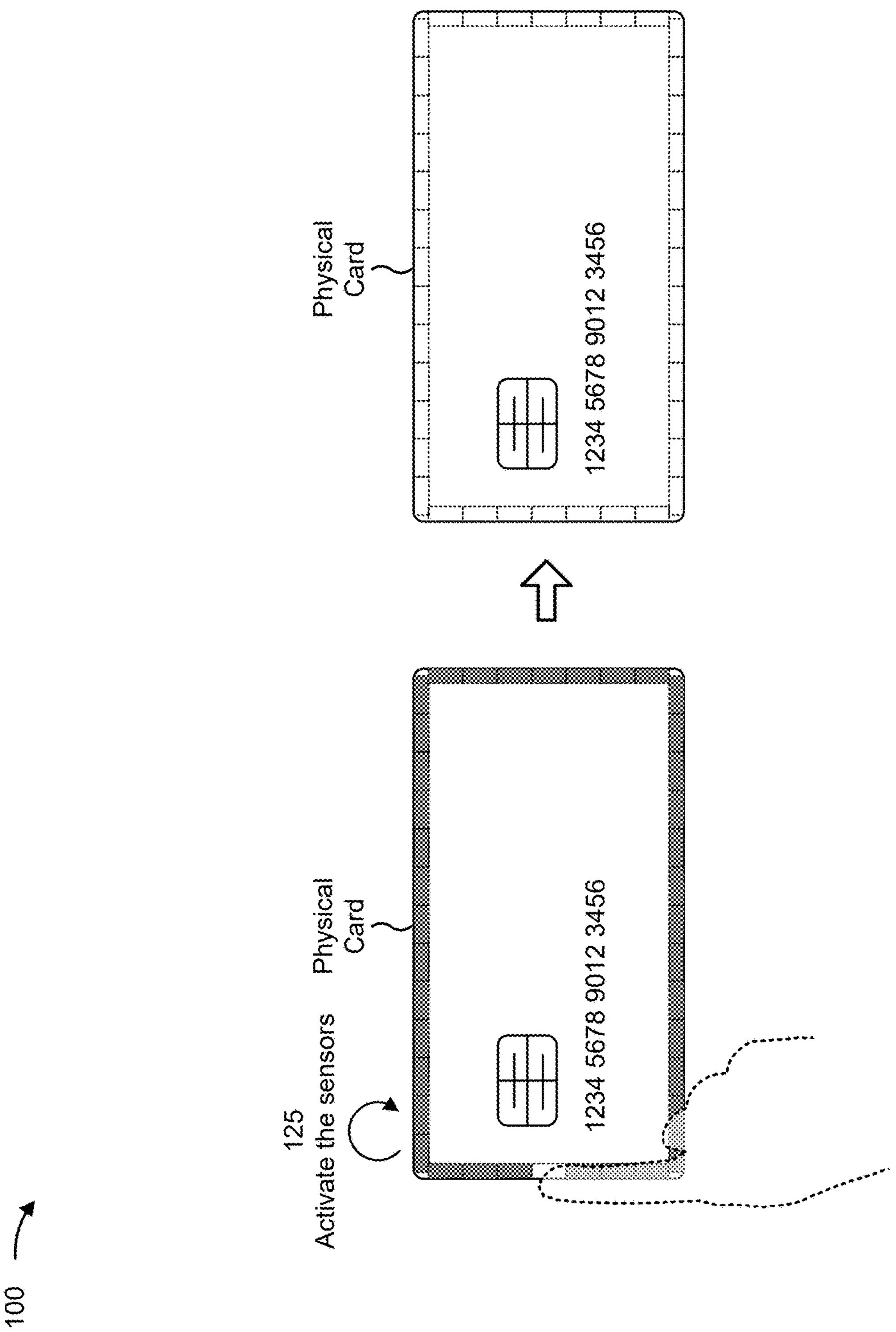

As shown in FIG. 1C, and by reference number 125, an individual using the physical card may activate the sensors around the outer edge of the physical card to enable the physical card to perform user authentication based on a touch profile. For example, the individual may activate the sensors in anticipation of performing a transaction using the physical card.

In some implementations, the sensors may include one or more first sensors configured to have an active state (e.g., a detecting state) and an inactive state (e.g., a sleep state), and one or more second sensors configured to have only an active state (e.g., an always-on detecting state). The second sensor(s) may have a particular (e.g., pre-defined) location on the outer edge of the physical card, and the individual may touch that particular location to waken the first sensors of the physical card. Accordingly, the physical card may monitor the second sensor(s) (e.g., active sensors) for sensor data indicating an activation touch. The physical card may activate (e.g., power on) the first sensors (e.g., inactive sensors) responsive to detection of the activation touch (e.g., output states of the second sensor(s) are indicative of the activation touch). In this way, the physical card conserves power that otherwise would be consumed by maintaining all of the sensors in an always-on mode.

Figure 1D:
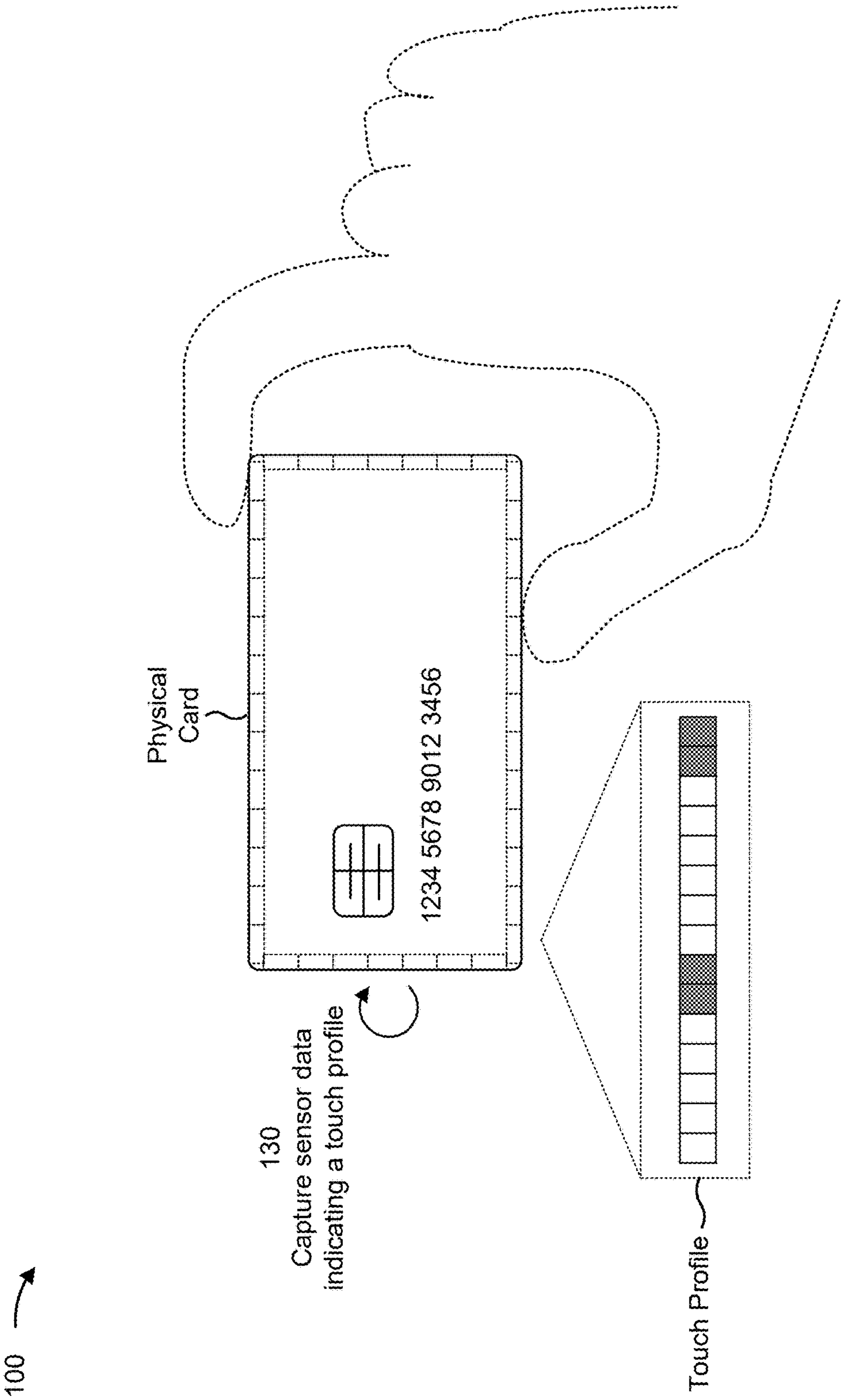

As shown in FIG. 1D, and by reference number 130, the physical card may capture, from the sensors around the outer edge of the physical card, sensor data indicating a touch profile detected along the outer edge. For example, the individual in possession of the physical card may grasp the physical card around its outer edge in order to input the touch profile prior to performing a transaction using the physical card (e.g., to enable the physical card for use in the transaction). The touch profile may indicate the finger placement of the hand of the individual holding the physical card. In particular, based on the finger placement, each of the sensors may have a particular output state (indicating whether the sensor is being touched or not touched), and a sequence of the sensors' output states may form the touch profile. The touch profile may provide a snapshot of the individual's finger placement at a particular time instance. In some implementations, the physical card may capture a single touch profile to use for user authentication. Alternatively, the physical card may capture multiple touch profiles (e.g., at different time instances) to use for user authentication.

Figure 1E:
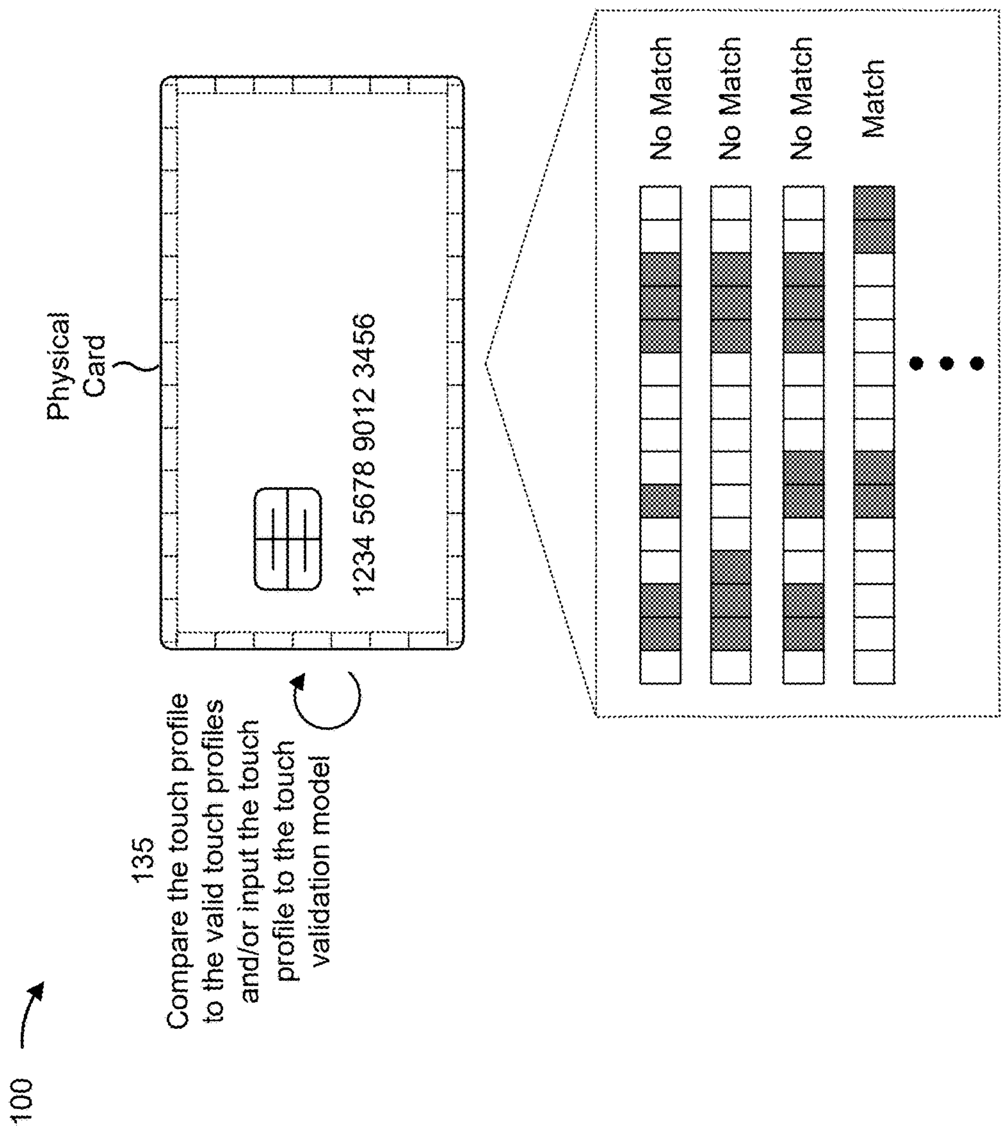

As shown in FIG. 1E, and by reference number 135, the physical card may compare the touch profile to the valid touch profiles stored by the physical card to determine whether there is a sufficient match between the touch profile and one of the valid touch profiles. For example, the physical card may compare the touch profile to a valid touch profile by comparing a sequence of output states of the sensors indicated by the touch profile to a sequence of output states of the sensors indicated by the valid touch profile. As an example, the physical card may determine that the touch profile sufficiently matches one of the valid touch profiles if at least a threshold number or percentage of output states match. Additionally, or alternatively, the physical card may input the touch profile to the touch validation model to determine whether the touch profile is valid in accordance with an output of the touch validation model. For example, the physical card may use output states of the sensors indicated by the touch profile in a formula of the touch validation model to produce an output indicating whether the touch profile is valid (or indicating a probably of whether the touch profile is valid, which the physical card can compare to a validity threshold). The physical card may be enabled or disabled (e.g., the physical card may enable or disable itself) in accordance with whether the touch profile is valid (e.g., sufficiently matches one of the valid touch profiles). In this way, the hand characteristics (e.g., hand shape) of an authorized user can provided an individualized biometric indicator (e.g., a biometric signature) for the user.

If the physical card has captured multiple touch profiles, then the physical card may compare each of the touch profiles to the valid touch profiles. Furthermore, the physical card may determine whether there is a sufficient match between the multiple touch profiles and the valid touch profiles. For example, the physical card may determine that the multiple touch profiles sufficiently match the multiple touch profiles if each of the multiple touch profiles sufficiently matches a respective valid touch profile, if a threshold quantity of the multiple touch profiles sufficiently match a respective valid touch profile, and/or if a threshold number or percentage of output states across the multiple touch profiles match output states of valid touch profiles. Additionally, or alternatively, the physical card may input each of the touch profiles to the touch validation model, and the physical card may determine whether all of the multiple touch profiles are valid, whether a threshold number of the multiple touch profiles are valid, whether an aggregate validity probability for the multiple touch profiles satisfies a threshold, or the like.

In some implementations, the touch profile input to the physical card may be used to indicate distress. For example, one or more particular touch profiles may be defined to allow an authorized user of the physical card to indicate distress in connection with the physical card (e.g., if the user is being forced to use the physical card under duress, the user is handing over the physical card in connection with a robbery, or the like). Accordingly, when comparing the touch profile to the valid touch profiles, the physical card may determine that the touch profile sufficiently matches a distress touch profile of the valid touch profiles. Additionally, or alternatively, the physical card may input the touch profile to the touch validation model, and the output of the touch validation model may indicate that the touch profile is (or has a probability of being) a distress touch profile. In some implementations, the physical card may permanently disable itself, may disable itself for a defined time period, and/or may set a distress flag, among other examples, based on determining that the touch profile is or sufficiently matches the distress touch profile.

Figure 1F:
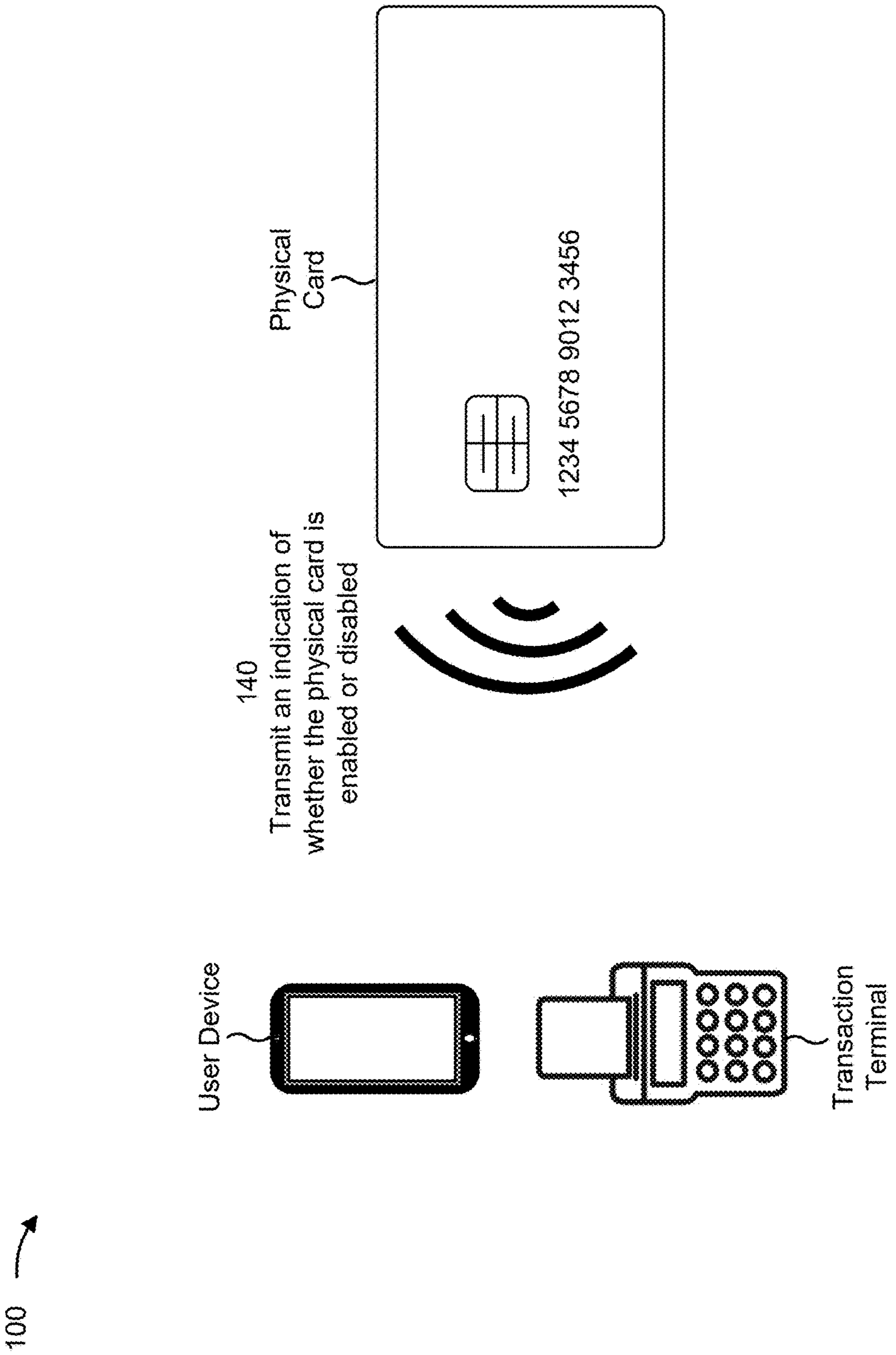

As shown in FIG. 1F, and by reference number 140, the physical card may transmit an indication of whether the physical card is enabled (e.g., unlocked or authorized) or disabled (e.g., locked or unauthorized) in accordance with whether the touch profile is valid (e.g., sufficiently matches one of the valid touch profiles). In some implementations, the physical card may be used in connection with an in-person transaction (e.g., a card-present transaction) at a transaction terminal (e.g., an ATM, a payment terminal, or the like). Accordingly, the physical card may transmit the indication to the transaction terminal, such as when the physical card is swiped through the transaction terminal, inserted into the transaction terminal, or tapped to the transaction terminal. In some implementations, the physical card may be used in connection with a remote transaction (e.g., a card-not-present transaction), such as an online transaction. Accordingly, the physical card may transmit the indication to a user device (e.g., using NFC), and the user device may forward the indication to a backend device that handles transaction processing. Use of the user device to forward the indication also provides an additional authentication factor (e.g., the backend device can verify that the user device that forwarded the indication has been registered for an authorized user of the physical card).

The indication of whether the physical card is enabled or disabled may be an express indication. For example, a set of information transmitted by the physical card to the transaction terminal or the user device may include a field (e.g., a bit) and a value of the field (e.g., "0" or "1") may indicate whether the physical card is enabled or disabled. Alternatively, the indication of whether the physical is enabled or disabled may be an implicit indication using account information associated with the physical card (e.g., information transmitted by the physical card to perform a transaction, such as an account number, an expiration date, a security code, or the like). For example, the physical card transmitting a valid account number, a valid expiration date, and/or a valid security code may indicate that the physical is enabled, whereas the physical card transmitting an invalid account number, an invalid expiration date, an invalid security code, and/or one or more empty fields in the set of information may indicate that the physical card is disabled.

In some implementations, if the touch profile input to the physical card was a distress touch profile and/or if the distress flag has been set, the physical card may transmit a distress indication indicating that the physical card is associated with a distress event. For example, the physical card may transmit the indication and/or the distress indication to the transaction terminal or the user device, as described above. In some examples, the distress indication may also serve as the indication that the physical card is disabled.

In response to receiving the distress indication, the transaction terminal or the user device may transmit a distress notification (e.g., indicating information associated with the physical card and/or information associated with an authorized user of the physical card) to a device associated with an entity that issued the physical card, a law enforcement entity, a back office security monitoring station, or the like. In some implementations, in response to receiving the distress indication, the transaction terminal or the user device may capture an image or a video of the individual in possession of the physical card (e.g., a fraudulent actor). The transaction terminal or the user device may store the image or video, or may include the image or video in the distress notification.

In this way, techniques described herein enable user authentication using hand characteristics, such as hand size, finger size, and/or finger length, as a biometric indicator. Hand characteristics provide a biometric authentication factor that is highly secure and difficult to exploit.

As indicated above, FIGS. 1A-1F are provided as an example. Other examples may differ from what is described with regard to FIGS. 1A-1F.

Figure 2:
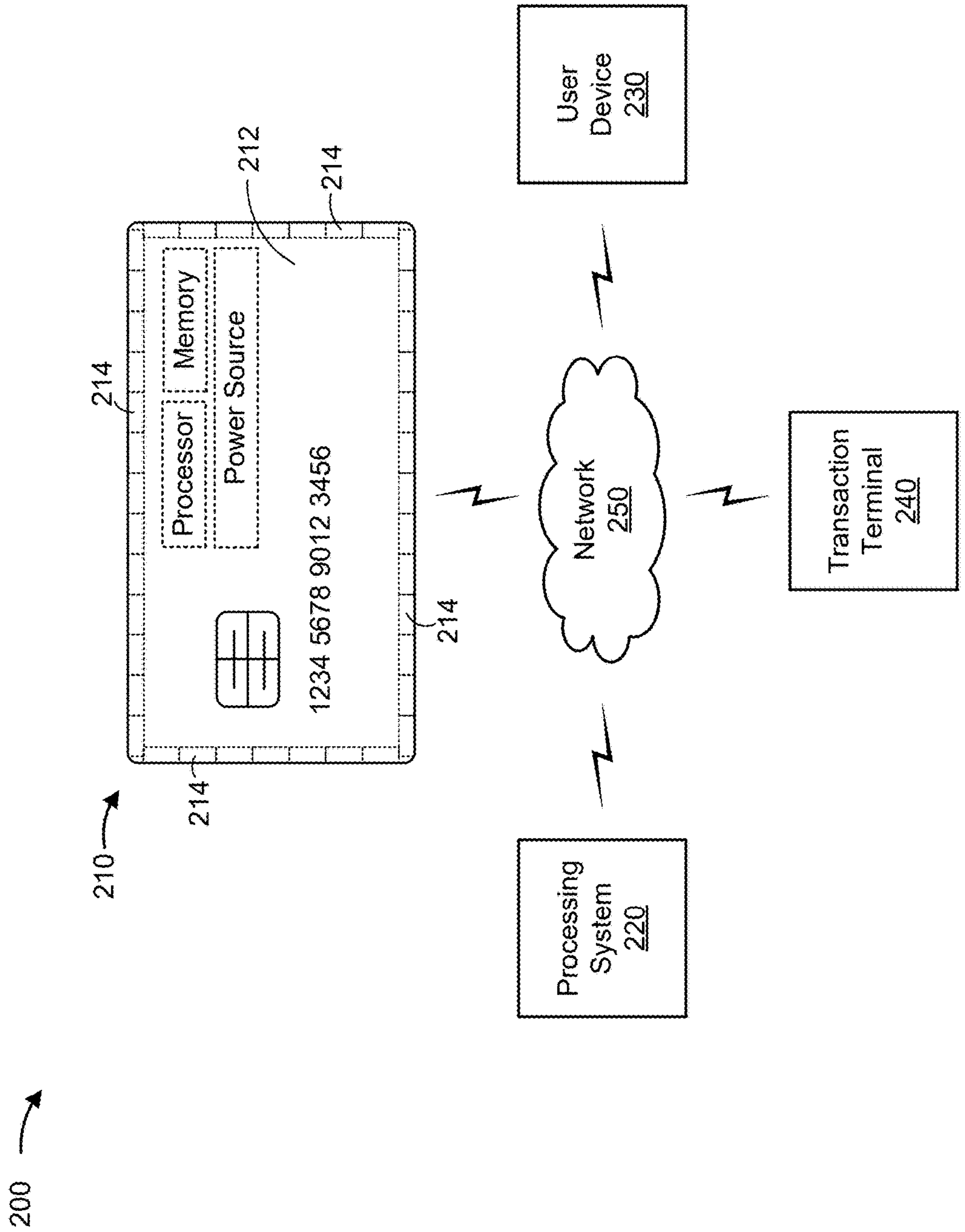
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a physical card 210, a processing system 220, a user device 230, a transaction terminal 240, and a network 250. Devices of environment 200 may interconnect via wired connections, wireless connections, or a combination of wired and wireless connections.

The physical card 210 may include one or more devices capable of being used for an electronic exchange (e.g., a payment transaction). The physical card 210 may include a physical medium with integrated circuitry capable of storing and communicating account information. For example, the physical card 210 may be a transaction card, such as a credit card, a debit card, a gift card, an ATM card, a transit card, a fare card, and/or an access card.

The physical card 210 may include a card body 212 (e.g., a substrate). The card body 212 may have a rectangular shape or another shape. A perimeter of the card body 212 may define an outer edge of the card body 212. As shown, a plurality of sensors 214 are positioned around the outer edge of the card body 212 (e.g., continuously or with small separations between sensors 214).

A sensor 214 may include a touch sensor (e.g., a capacitive touch sensor or a resistive touch sensor), a temperature sensor, a photosensor, and/or another type of sensor that can detect a finger placement of a user holding the physical card 210. An output state of a sensor 214 may indicate whether the sensor 214 is being touched, or is not being touched, by a person. For example, a voltage output by a touch sensor (e.g., indicating an output state of the touch sensor) may change in response to being touched by a person. As another example, a voltage output by a temperature sensor (e.g., indicating an output state of the temperature sensor) may change in response to changes in temperature at the temperature sensor (e.g., the changes in temperature may correlate to whether a person's finger, which generally has a different temperature than ambient air, has been placed on the temperature sensor). As a further example, a voltage output by a photosensor (e.g., indicating an output state of the photosensor) may change in response to changes in light at the photosensor (e.g., the changes in light may correlate to whether a person's finger is blocking light from reaching the photosensor).

In some implementations, the physical card 210 may include (e.g., in or on the card body 212) a memory, a processor communicatively coupled to the memory and/or the sensors 214, an antenna, and/or a power source (e.g., a battery, a photovoltaic cell, or the like) configured to power the memory, the processor, and/or the sensors 214.

The physical card 210 may store account information associated with the physical card 210, which may be used in connection with an electronic exchange. The account information may include, for example, an account identifier that identifies an account (e.g., a bank account or a credit account) associated with the physical card 210 (e.g., an account number, a card number, a bank routing number, and/or a bank identifier), a cardholder identifier (e.g., identifying a name of a person, business, or entity associated with the account or the physical card 210), expiration information (e.g., identifying an expiration month and/or an expiration year associated with the physical card 210), a security code, and/or a credential (e.g., a payment token). In some implementations, the physical card 210 may store the account information in the memory of the physical card 210. As part of performing an electronic exchange, the physical card 210 may transmit the account information to a transaction terminal using a communication component, such as a magnetic stripe, an integrated circuit (IC) chip (e.g., a EUROPAY®, MASTERCARD®, VISA® (EMV) chip), and/or a contactless communication component (e.g., the antenna, an NFC component, a radio frequency (RF) component, a Bluetooth component, and/or a Bluetooth Low Energy (BLE) component). Thus, the physical card 210 and the transaction terminal may communicate with one another by coming into contact with one another (e.g., using a magnetic stripe or an EMV chip) or via contactless communication (e.g., using NFC).

The processing system 220 may include one or more devices capable of receiving, generating, storing, processing, providing, and/or routing information associated with hand-based biometric authentication, as described elsewhere herein. The processing system 220 may include a communication device and/or a computing device. For example, the processing system 220 may include a server, such as an application server, a client server, a web server, a database server, a host server, a proxy server, a virtual server (e.g., executing on computing hardware), or a server in a cloud computing system. In some implementations, the processing system 220 may include computing hardware used in a cloud computing environment.

The user device 230 may include one or more devices capable of receiving, generating, storing, processing, and/or providing information associated with hand-based biometric authentication, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The transaction terminal 240 may include one or more devices capable of facilitating an electronic transaction. For example, the transaction terminal 240 may include a point-of-sale (POS) terminal, a payment terminal (e.g., a credit card terminal, a contactless payment terminal, a mobile credit card reader, or a chip reader), and/or an ATM. In some implementations, the transaction terminal 240 may include an access control terminal (e.g., used to control physical access to a secure area), such as an access control panel used to control an access-controlled entry (e.g., a turnstile, a door, a gate, or another physical barrier). The transaction terminal 240 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the transaction terminal 240 include a number keypad, a touchscreen, a magnetic stripe reader, a chip reader, and/or an RF signal reader (e.g., an NFC reader). Example output devices of transaction terminal 240 include a display and/or a speaker. In some implementations, the transaction terminal 240 may be capable of receiving, generating, storing, processing, and/or providing information associated with hand-based biometric authentication.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
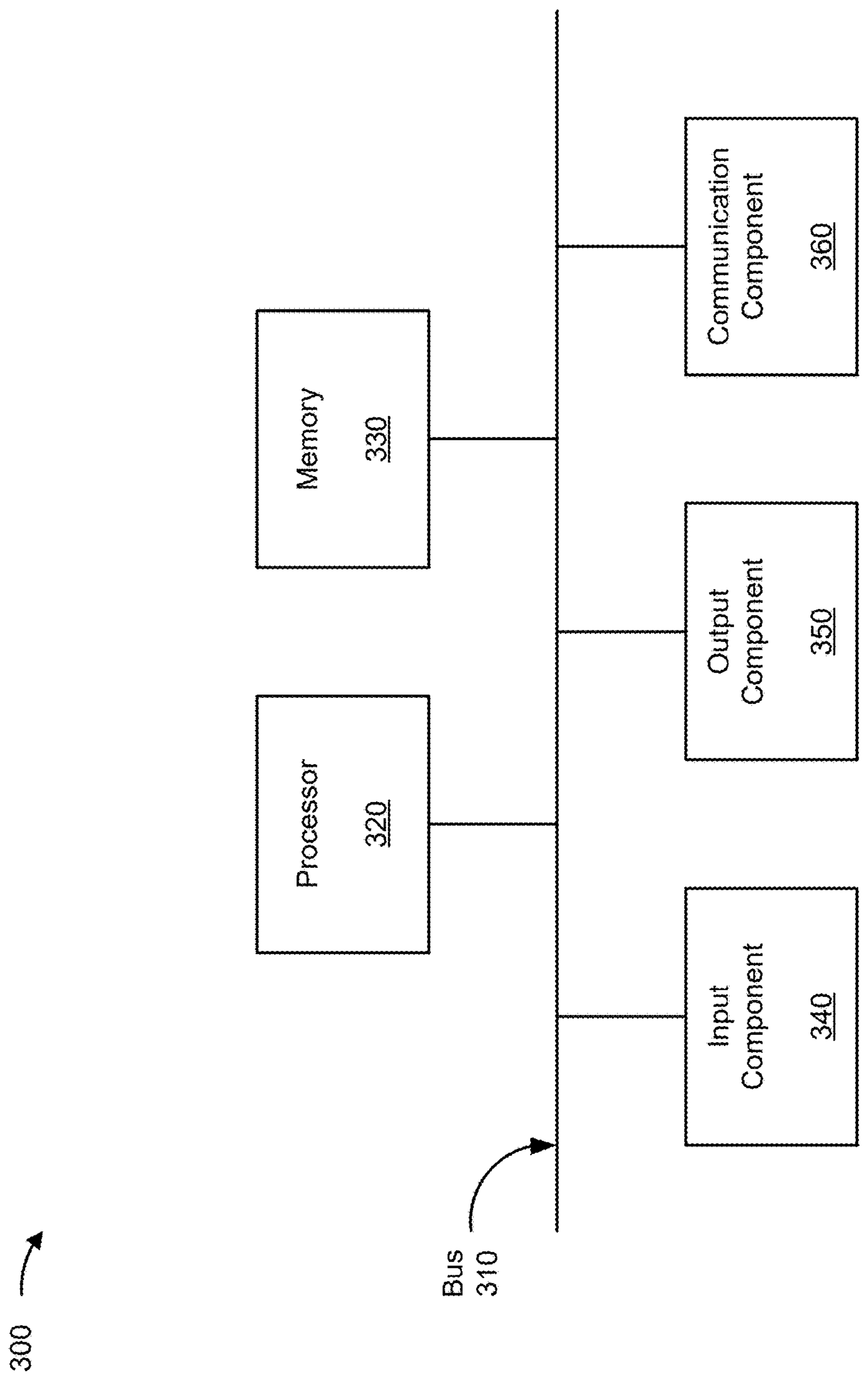
FIG. 3 is a diagram of example components of a device associated with hand-based biometric authentication, in accordance with some embodiments of the present disclosure.

FIG. 3 is a diagram of example components of a device 300 associated with hand-based biometric authentication. The device 300 may correspond to physical card 210, processing system 220, user device 230, and/or transaction terminal 240. In some implementations, physical card 210, processing system 220, user device 230, and/or transaction terminal 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
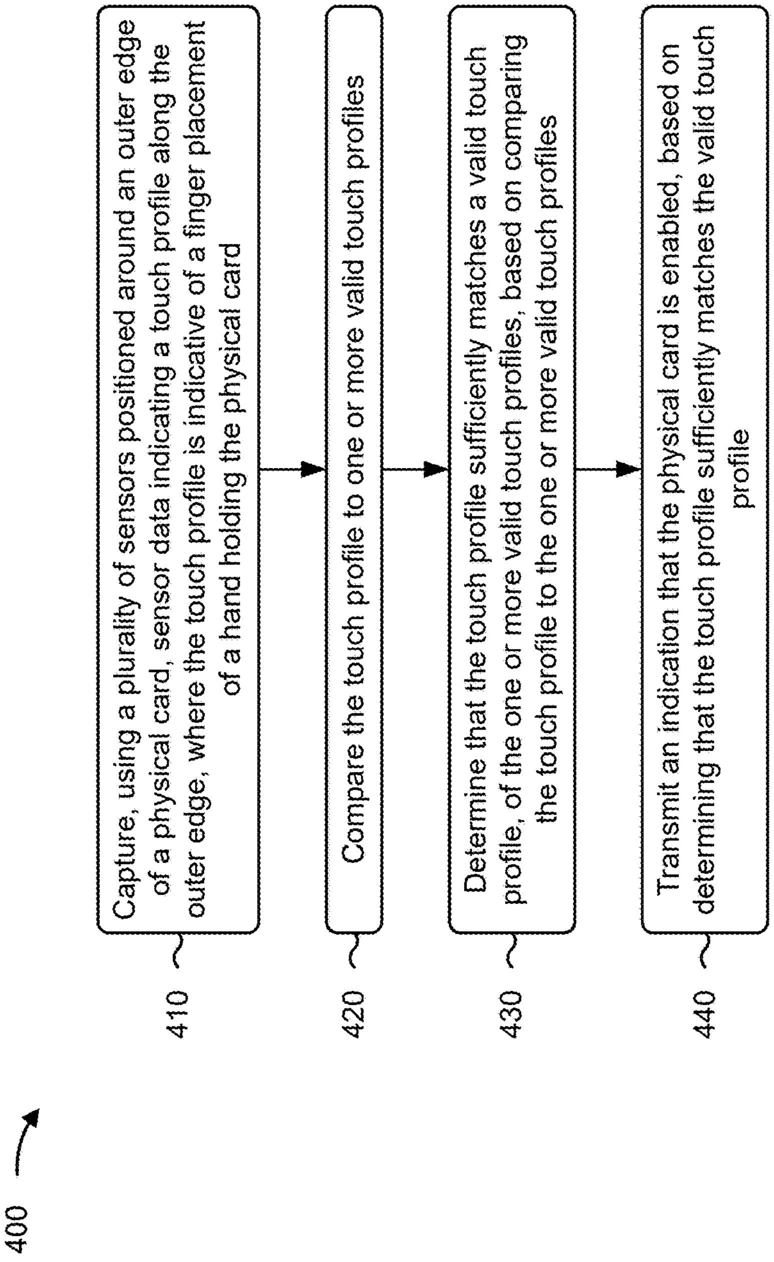
FIG. 4 is a flowchart of an example process associated with hand-based biometric authentication, in accordance with some embodiments of the present disclosure.

FIG. 4 is a flowchart of an example process 400 associated with hand-based biometric authentication. In some implementations, one or more process blocks of FIG. 4 may be performed by the physical card 210. In some implementations, one or more process blocks of FIG. 4 may be performed by another device or a group of devices separate from or including the physical card 210, such as the processing system 220, the user device 230, and/or the transaction terminal 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include capturing sensor data indicating a touch profile along an outer edge of a physical card, where the touch profile is indicative of a finger placement of a hand holding the physical card (block 410). For example, the physical card 210 (e.g., using processor 320 and/or memory 330) may capture sensor data indicating a touch profile along its outer edge, as described above in connection with reference number 130 of FIG. 1D. As an example, based on the finger placement, each of the sensors may have a particular output state (indicating whether the sensor is being touched or not touched), and a sequence of the sensors' output states may form the touch profile such that the touch profile provides a snapshot of the individual's finger placement at a particular time instance.

As further shown in FIG. 4, process 400 may include comparing the touch profile to one or more valid touch profiles (block 420). For example, the physical card 210 (e.g., using processor 320 and/or memory 330) may compare the touch profile to one or more valid touch profiles, as described above in connection with reference number 135 of FIG. 1E. As an example, comparing the touch profile to a valid touch profile may include comparing a sequence of output states of the sensors indicated by the touch profile to a sequence of output states of the sensors indicated by the valid touch profile.

As further shown in FIG. 4, process 400 may include determining that the touch profile sufficiently matches a valid touch profile, of the one or more valid touch profiles, based on comparing the touch profile to the one or more valid touch profiles (block 430). For example, the physical card 210 (e.g., using processor 320 and/or memory 330) may determine that the touch profile sufficiently matches a valid touch profile, of the one or more valid touch profiles, based on comparing the touch profile to the one or more valid touch profiles, as described above in connection with reference number 135 of FIG. 1E. As an example, the touch profile may sufficiently match one of the valid touch profiles when at least a threshold number or percentage of output states match.

As further shown in FIG. 4, process 400 may include transmitting an indication that the physical card is enabled, based on determining that the touch profile sufficiently matches the valid touch profile (block 440). For example, the physical card 210 (e.g., using processor 320, memory 330, and/or communication component 360) may transmit an indication that the physical card is enabled, based on determining that the touch profile sufficiently matches the valid touch profile, as described above in connection with reference number 140 of FIG. 1F. As an example, the indication may be transmitted to a transaction terminal in connection with an in-person transaction or to a user device in connection with a remote transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for biometric authentication, comprising:

a processing system, comprising:

one or more memories; and one or more processors, communicatively coupled to the one or more memories, configured to:

receive anatomical data relating to a hand of an authorized user, the anatomical data being used to identify hand characteristics of the hand including at least one of hand shape, hand size, finger size, or finger length; and process the anatomical data to identify one or more valid touch profiles each indicating valid finger placements on a physical card that are based on the anatomical data; and the physical card, comprising:

a card body; and a plurality of sensors around an outer edge of the card body, wherein the physical card is configured to:

receive information indicating the one or more valid touch profiles;

capture, from the plurality of sensors, sensor data indicating a touch profile along the outer edge; and compare the touch profile to the one or more valid touch profiles, wherein the physical card is to be enabled or disabled in accordance with whether the touch profile sufficiently matches a valid touch profile of the one or more valid touch profiles.

2. The system of claim 1, wherein the one or more processors are further configured to:

transmit, for a user device or a terminal, the information indicating the one or more valid touch profiles.

3. The system of claim 1, wherein the physical card, to receive the information indicating the one or more valid touch profiles, is configured to:

receive the information indicating the one or more valid touch profiles from a user device or a terminal.

4. The system of claim 1, wherein the one or more processors, to process the anatomical data, are configured to process the anatomical data using a machine learning model.

5. The system of claim 4, wherein the machine learning model is trained to output the one or more valid touch profiles from an input of the anatomical data using a feature set that includes one or more of hand size, finger size, or finger length.

6. The system of claim 1, wherein the plurality of sensors includes a plurality of touch sensors.

7. The system of claim 1, wherein the anatomical data includes one or more of an image of the hand, a video of the hand, or touchscreen input data associated with the hand.

8. The system of claim 1, wherein the hand size includes at least one of overall hand width, overall hand length, palm width, palm length, or distances between fingers.

9. A physical card, comprising:

a card body;

a plurality of sensors around an outer edge of the card body;

one or more memories, in the card body, that store a touch validation model; and one or more processors, in the card body and communicatively coupled to the plurality of sensors and the one or more memories, configured to cause the physical card to:

capture, from the plurality of sensors, sensor data indicating a touch profile detected along the outer edge;

input the touch profile to the touch validation model that determines whether the touch profile sufficiently matches a valid touch profile of one or more valid touch profiles each indicating valid finger placements on the physical card that are based on hand characteristics of a hand including at least one of hand shape, hand size, finger size, or finger length; and transmit an indication of whether the physical card is enabled, in accordance with an output of the touch validation model.

10. The physical card of claim 9, wherein the plurality of sensors includes one or more first sensors configured to have an active state and an inactive state, and one or more second sensors configured to have only an active state.

11. The physical card of claim 10, wherein the one or more processors are further configured to cause the physical card to:

monitor the one or more second sensors for the sensor data to indicate an activation touch; and activate the one or more first sensors responsive to detection of the activation touch.

12. The physical card of claim 9, wherein the one or more processors, to cause the physical card to transmit the indication, are configured to cause the physical card to:

transmit the indication to a terminal.

13. The physical card of claim 9, wherein the one or more processors, to cause the physical card to transmit the indication, are configured to cause the physical card to:

transmit the indication to a user device.

14. The physical card of claim 9, wherein the plurality of sensors includes a plurality of touch sensors.

15. The physical card of claim 9, wherein the plurality of sensors includes at least one of:

a plurality of photosensors, or a plurality of temperature sensors.

16. A method of biometric authentication, comprising:

capturing, by a physical card using a plurality of sensors positioned around an outer edge of the physical card, sensor data indicating a touch profile along the outer edge, wherein the touch profile is indicative of a finger placement of a hand holding the physical card;

comparing, by the physical card, the touch profile to one or more valid touch profiles each indicating valid finger placements on the physical card that are based on hand characteristics of the hand including at least one of hand shape, hand size, finger size, or finger length;

determining, by the physical card, that the touch profile sufficiently matches a valid touch profile, of the one or more valid touch profiles, based on comparing the touch profile to the one or more valid touch profiles; and transmitting, by the physical card to a terminal or a user device, an indication that the physical card is enabled, based on determining that the touch profile sufficiently matches the valid touch profile.

17. The method of claim 16, further comprising:

receiving, from a terminal or a user device, information indicating the one or more valid touch profiles.

18. The method of claim 16, wherein comparing the touch profile to the 17. one or more valid touch profiles comprises:

determining that the touch profile corresponds to a distress touch profile of the one or more valid touch profiles, and wherein the method further comprises:

transmitting a distress indication that the physical card is associated with a distress event.

19. The method of claim 16, further comprising:

monitoring one or more active sensors for the sensor data to indicate an activation touch; and activating one or more inactive sensors responsive to detection of the activation touch.

20. The method of claim 16, wherein transmitting the indication that the physical card is enabled comprises:

transmitting account information for the physical card.

* * * * *